United States Patent Office 3,423,644
Patented Jan. 21, 1969

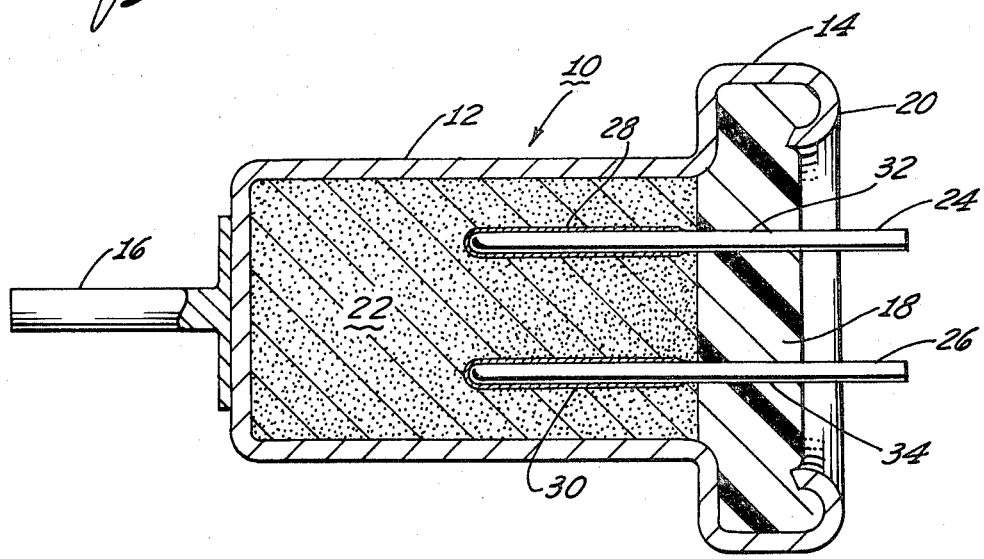
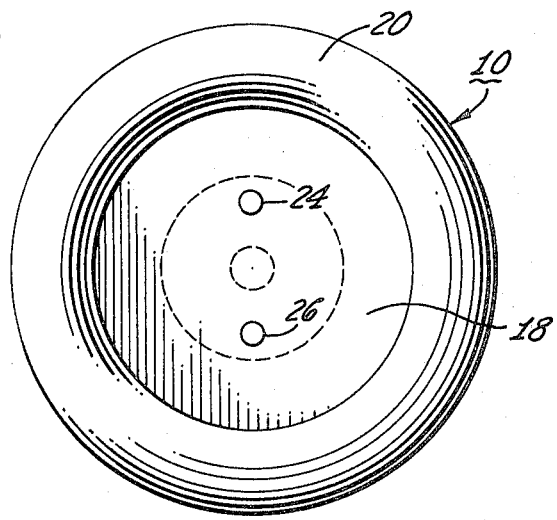

3,423,644
ELECTROLYTIC CELL WITH HOUSING COMPRISING ELECTRODE AND SEAL PORTIONS
Martin Mintz, Woodland Hills, Calif., assignor to The Bissett-Berman Corporation, Santa Monica, Calif., a corporation of California
Filed Jan. 12, 1967, Ser. No. 608,856
U.S. Cl. 317—231          15 Claims
Int. Cl. H01g 9/04

ABSTRACT OF THE DISCLOSURE

This invention relates to electrolytic cells. Generally the invention relates to electrolytic cells including an outer housing serving as a first outer electrode, and with the outer housing having an open and a closed end and with an insulating member extending across the open end of the outer housing, and with at least one inner electrode extending through the insulating member and sealed to the insulating member prior to the sealing of the insulating member across the open end of the outer housing.

---

Electrolytic cells are used for various timing and integration functions. For example, a typical electrolytic cell includes at least two electrodes and wherein at least one of the two electrodes includes a layer of active material. The active material may be a material such as silver. Also at least one of the two electrodes includes a layer of an inert material which may be used as a plateable surface for the active material. For example, the inert material may be gold. As one example of an electrolytic cell, two electrodes each having a layer of inert material may extend within a sealed housing. One of the two electrodes additionally may include a layer of active material. An electrolyte is included in the housing and is used as a medium to transfer the active material between the two electrodes. The active material is transferred by connecting a source of electrical energy between the electrodes so that an electrical current passes through the electrolyte from one electrode to the other.

An alternate construction for an electrolytic cell is in having the housing which contains the electrolyte also serve as the outer electrode. For example the housing may be constructed of the active material such as silver or the housing may include a layer of the active material such as silver. The housing may be in teh shape of a cup having an open and a closed end and an inner electrode may extend into the housing from the open end. The inner electrode may be sealed across the open end of the housing so as to seal the electrolyte within the housing. The inner electrode contains a layer of inert material such as gold, and the active material from the outer housing could be transferred between the outer housing and the inner electrode through the electrolyte.

In the prior art of electrolytic cells the inner electrode may include a flange portion. The flange portion of the inner electrode is designed to fit within an enlarged portion of the outer housing and a pair of insulating members sandwich the flange portion within the enlarged portion of the outer housing. The open end of the outer housing is then crimped over so as to seal the inner electrode across the open end of the outer housing. An electrolytic cell having a structure as described above is disclosed in patent application Ser. No. 519,634 filed Jan. 10, 1966 in the name of Martin Mintz and assigned to the same assignee as the instant case.

Although the above-described electrolytic cell structure operates in a successful manner, the structure of the cell is relatively complex and difficult to produce on a mass production basis. For example the inner electrode must include the flange member which is used to seal the open end of the outer electrode. Also it is difficult to produce multiple electrode electrolytic cells having a plurality of inner electrodes using the flange method of sealing. For example electrolytic cells which include a plurality of inner electrodes and which are sealed using the flange method of sealing are shown in Ser. No. 587,590 filed Oct. 18, 1966, in the name of Edward J. Plehal, Gene Frick and Martin Mintz and assigned to the same assignee as the instant case. It can be seen in Ser. No. 587,590 that it is relatively difficult to construct the multiple inner electrode electrolytic cells using the flange method of sealing since the inner electrodes are concentric with each other. Also since the inner electrodes are concentric with each other, the size of the electrolytic cell greatly increases as the number of inner electrodes increase.

The present invention is therefore directed to an electrolytic cell which is simpler in construction than the above described prior art electrolytic cells. The electrolytic cell of the present invention includes an insulating member having at least one opening through the insulating member and with an inner electrode extending through and sealed within the opening in the insulating member. The insulating member including the inner electrode is then sealed across the open end of an outer housing by deforming or crimping the housing.

The present invention is also directed to the use of a pair of insulating members to form the seal across the open end of the outer housing. For example a first insulating member may be composed of relatively hard material and the inner electrodes are sealed within openings through the first insulating member. A second insulating member composed of a relatively soft insulating material is disposed within the open end of the outer housing on top of the first insulating member. The outer housing is then deformed or crimped against the second insulating member so as to produce the seal of the electrolytic cell.

In the electrolytic cell of the present invention the inner electrode members extend through and are sealed within openings in an insulating member. The inner electrodes may be sealed to the insulating member by one of two methods. In a first method of sealing the inner electrodes are maintained in a sealed relation within insulating member through a compression of the insulating member against one inner electrode. The compression seal is formed prior to the time the insulating member is sealed across the open end of the outer housing. In the prior art, compression seals sometimes are used to perform two sealing operations. In the present invention each seal is independent of the other to ensure greater reliability of the electrolytic cells. When the inner electrodes are sealed within the insulating member through the use of a compression seal the insulating member is usually composed of an insulating material which is relatively soft.

A second method of sealing the inner electrodes within the opening through the insulating member is by the use of a bonding agent. For example, certain adhesives such as epoxy adhesives may be used to bond the inner electrodes within the openings through the insulating member so as to produce a seal between the inner electrodes and the insulating member.

A clearer understanding of the invention will be had with reference to the following description and drawings wherein:

FIGURE 1 is a cross-sectional view of a first embodiment of the invention;

FIGURE 2 is an end view of the embodiment of FIGURE 1;

Figure 3:
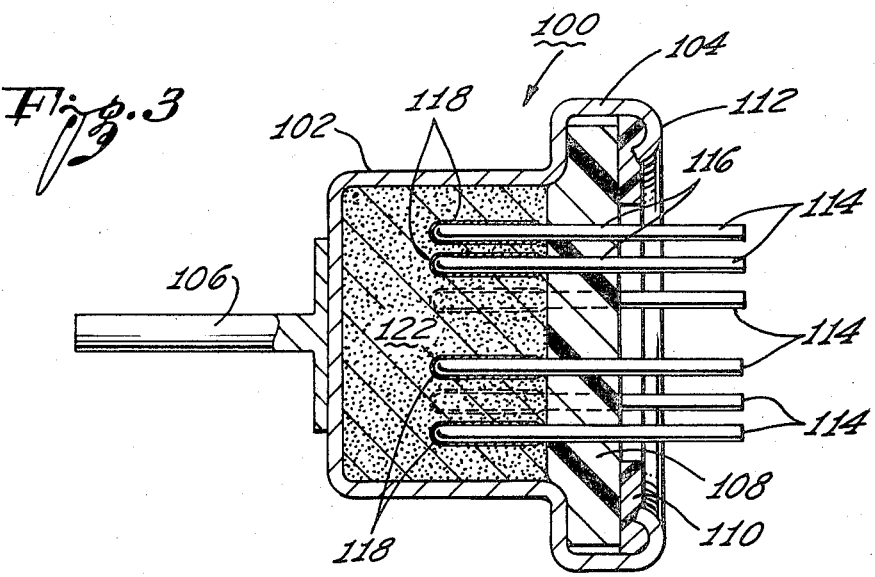
FIGURE 3 is a cross-sectional view of a second embodiment of the invention.

In FIGURE 1 an electrolytic cell 10 includes an outer electrode 12 which serves as an outer housing. The outer electrode 12 includes an enlarged portion 14 which is at the open end of the outer electrode. The outer electrode may be composed of an active material and may be composed of a material such as silver. It is also to be appreciated that the outer electrode 12 may be composed of a base material which has a plating of the active material such as silver. A lead member 16 is attached to the closed end of the outer electrode 12 by any convenient means such as soldering, welding, brazing, etc.

An insulating member 18 is disposed within the enlarged portion 14 of the outer electrode 12. The insulating member may be composed of an appropriate plastic elastomer material such as polychlorotrifluoroethylene sold under the trade name of Kel-F by the Minnesota Mining and Manufacturing Co. The insulating member 18 is composed of an insulating material which is relatively soft since the insulating material 18 is used to provide the seal across the open end of the outer electrode 12. The seal may be completed by crimping over a portion 20 of the enlarged section 14 of the outer electrode 12 so as to force the insulating member 18 into close engagement with the enlarged section 14. It is desirable that the electrolytic cell be sealed since the outer housing 12 contains an electrolytic solution 22.

The insulating member 18 also supports a pair of inner electrode members 24 and 26. The inner electrode may be constructed of a base material which has been coated with a layer of inert material. The inert material may be a material such as gold. The gold layer provides a good surface for the plating of the active material such as silver. For example, as shown in FIGURE 1, the inner electrodes 24 and 26 both include a layer of active material 28 and 30. The active material 28 and 30 may be externally plated on the inner electrodes before the inner electrodes are positioned within the electrolyte or the active material 28 and 30 may be internally plated from the outer housing on the inner electrodes 24 and 26 after the inner electrodes are positioned in the electrolyte and the electrolytic cell is sealed.

The inner electrodes 24 and 26 extend through openings 32 and 34 in the insulating member 18. The inner electrodes 24 and 26 are then sealed within the openings 32 and 34. The sealing of the inner electrodes within the openings 32 and 34 may be performed in a variety of ways. For example, the inner electrodes may be sealed by a compression of the insulating member 18. The compression may be produced by having the openings 32 and 34 undersized so that the insulating member 18 maintains a tight grip on the inner electrode members 24 and 26.

Another method in which the compression may be produced is to use a material for the insulating member 18 which shrinks while cooling. The insulating member is then hot formed and the inner electrodes are positioned within the openings in the insulating member so that as the insulating member 18 cools it shrinks to compressively seal the inner electrode members 24 and 26.

A third method of compressively sealing is to use material for the insulating member 18 which shrinks during a curing operation. For example certain insulating materials must be cured before they can be used. The inner electrode members 24 and 26 are disposed through the openings 32 and 34 and the insulating member 18 is then cured so as to shrink and grip the inner electrode members 24 and 26.

In addition to the sealing of the inner electrode members through the use of compression produced by the insulating member 18, the inner electrode members 24 and 26 may also be sealed to the insulating member 18 through molecular bonding. For example adhesives such as epoxies may be used so as to bond the insulating member 18 to the inner electrode members 24 and 26 so as to produce a seal.

FIGURE 2 illustrates a side view of the electrolytic cell of FIGURE 1. It can be seen in FIGURE 2 that the inner electrode members 24 and 26 are symmetrically disposed through the insulating member 18. Any forces within the insulating member 18 are therefore evenly distributed so as to eliminate the possibility of unequal forces causing leakage of the electrolytic cell.

It is also to be appreciated that in the electrolytic cell of FIGURES 1 and 2, the seal between the inner electrodes 24 and 26 and the insulating member 18 is independent of the seal between the insulating member 18 and the outer electrode 12. Since the different seals are independent of each other, there is a greater likelihood that the electrolytic cell has an increased reliability. Some prior art devices use a compressive force to both seal the outer electrode and the inner electrodes to the insulating member. This results in a decreased reliability since there is a greater chance that the single sealing force will fail and cause the electrolytic cell to leak.

In FIGURE 3 a second embodiment of the invention is shown. In FIGURE 3 an electrolytic cell 100 includes an outer electrode 102 which has an enlarged portion 104. The outer electrode 102 may be composed of an active material such as silver or may be composed of a base material which has an inner layer of an active material such as silver. A lead member 106 is attached to the closed end of the outer electrode 102 by any appropriate method such as welding, brazing, soldering, etc.

An insulating member 108 extends across the open end of the outer electrode 102 and fits within the enlarged portion 104 of the outer electrode. As can be seen in FIGURE 3, it is not necessary for the insulating member to fit completely across the enlarged portion 104 of the outer electrode 102 since the seal of the open end of the outer electrode 102 is not dependent upon the insulating member 108.

An additional ring of insulating member 110 is disposed within the enlarged open end 104 of the outer electrode 102. A portion 112 of the enlarged portion 104 is crimped over so as to provide a seal across the open end of the outer electrode 102. The insulating member 108 may be constructed of a relatively stiff or hard insulating material such as polyethylene or a polytetrafluoroethylene commonly known and sold under the trademark of Teflon by the Du Pont Co. The insulating member 110 may be composed of a softer insulating material, for example a polychlorotrifluoroethylene sold under the trade name of Kel-F by the Minnesota Mining and Manufacturing Co., or any appropriate elastomer material.

A plurality of inner electrodes 114 extend through a plurality of openings 116 in the insulating material 108. As discussed above with reference to FIGURE 1, the inner electrode members 114 may be composed of a base material which has been coated with a layer of inert material such as gold. In addition the inner electrodes 114 may include layers of active material 118 which may be deposited either before or after the electrolytic cell has been sealed.

The inner electrodes 114 are sealed to the insulating material 108 through any appropriate means such as through a compressive seal or through bonding. Since the insulating member 108 is composed of relatively hard insulating material it would be difficult to provide a seal between the insulating material and the inner electrodes 114 through the use of a compression seal unless the compression was accomplished through a shrinkage of the insulating material as it cools or through a curing of the insulating material. However, the inner electrodes 114 may be sealed to the insulating material 108 through the use of a bonding agent such as an adhesive which bonds the surface of the inner electrodes 114 to the insulating member 108.

Figure 4:
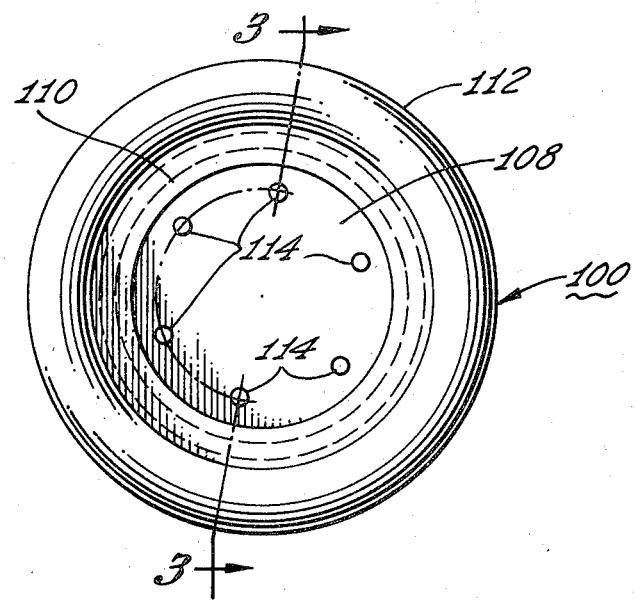
FIGURE 4 is an end view of the embodiment of FIGURE 3.

As shown in FIGURE 4, six inner electrodes are disposed through the insulating member 108. It is to be appreciated that the inner electrodes 114 are sealed to the insulating member 108 by sealing techniques independent of the sealing of the insulating member 108 to the outer electrode. This ensures an increased reliability of the electrolytic cell 100 since the seals are not dependent upon one another.

As can be seen by the above description the present invention relates to electrolytic cells which include an insulating member which has at least a single inner electrode sealed through the insulating member and wherein the insulating member is sealed across the open end of an outer electrode. The sealing of the inner electrode and the outer electrode to the insulating member independent of each other so as to ensure increased reliability of the electrolytic cell.

In addition it is to be appreciated that the electrolytic cells of the present invention may incorporate a plurality of such inner electrodes since it is only necessary to provide additional openings in the insulating member 108. The present invention therefore is directed to a simpler electrolytic cell structure than that provided for by the prior art electrolytic cells. As indicated with reference to FIGURES 1 and 2, it is desirable that the inner electrodes extend through the insulating members in a symmetrical fashion as to equalize the forces in the insulating member and help to maintain a proper seal of the inner electrodes through the insulating member.

It is also to be noted that the outer housing, such as the outer housing 12 of FIGURE 1 or the outer housing 102 of FIGURE 3, need not be used as an electrode when two or more inner electrodes, such as inner electrodes 24 and 26 of FIGURE 1 or inner electrodes 114 of FIGURE 3, extend through the insulator 18 of FIGURE 1 or the insulator 108 of FIGURE 3. When the outer housing is not used as an electrode, proper operation of the electrolytic cell is produced by transferring the active material between the inner electrodes.

It is to be appreciated that the invention has been described with reference to particular embodiments and that other adaptations and modifications may be made. The invention therefore is only to be limited by the appended claims.

What is claimed is:

1. An electrolytic cell structure including
an outer housing member having a closed end and an open end and a wall thereof including electrochemically active material and with the open end having having an enlarged portion and with the outer housing forming an outer electrode,
an insulating member including at least one opening extending through the insulating member,
at least one inner electrode extending through the opening in the insulating member and with the inner electrode including a surface opposite said outer electrode to receive said active material and with the inner electrode sealed within the opening in the insulating member,
the insulating member including the sealed inner electrode disposed within the enlarged portion of the outer housing member and sealed within the enlarged portion of the outer housing, and
an electrolyte disposed within the outer housing and in contact with the outer housing and the inner electrode surface and said electrolyte being a medium for transferring said active material between the inner and outer electrodes.

2. The electrolytic cell of claim 1 wherein the insulating member including the sealed inner electrode is sealed within the enlarged portion of the outer housing by disposing the end of the enlarged portion of the outer housing against the insulating member.

3. The electrolytic cell of claim 1 wherein the inner electrode is sealed within the opening in the insulating member by a compressive force on the inner electrode produced by the insulating member.

4. The electrolytic cell of claim 1 wherein the inner electrode is sealed within the opening in the insulating member by a bonding material disposed between the inner electrode and the opening in the insulating member.

5. An electrolytic cell structure including
an outer housing member having a closed end and an open end and a wall thereof including electrochemically active material and with the open end having an enlarged portion and with the outer housing forming as an outer electrode,
an insulating member including a plurality of openings extending through the insulating member,
a plurality of inner electrodes and with each inner electrode extending through one of the plurality of openings in the insulating member and with each of the inner electrodes including a surface opposite said outer electrode to receive said active material and with each of the inner electrodes sealed within an opening in the insulating member,
the insulating member including the sealed inner electrodes disposed within the enlarged portion of the outer housing member and sealing said housing at the enlarged portion thereof, and
an electrolyte disposed within the outer housing and in contact with the outer housing and the inner electrode surfaces and said electrolyte being a medium for transferring said active material between the inner electrode surfaces and the outer electrode.

6. The electrolytic cell of claim 5 wherein the insulating member including the sealed inner electrodes is sealed within the enlarged portion of the outer housing by disposing the end of the enlarged portion of the outer housing against the insulating member.

7. The electrolytic cell of claim 5 wherein the inner electrodes are sealed within the openings in the insulating member by a bonding material disposed between the inner electrodes and the openings in the insulating member.

8. The electrolytic cell of claim 5 wherein the inner electrodes are sealed within the openings in the insulating member by a compressive force on the inner electrodes produced by the insulating member.

9. The electrolytic cell of claim 5 wherein the inner electrodes are disposed in a symmetrical pattern through the insulating member.

10. An electrolytic cell structure including
an outer housing member having a closed end and an open end and a wall thereof including electrochemically active material and with the outer housing forming an outer electrode,
an insulating member including an opening extending through the insulating member,
an inner electrode extending through the opening in the insulating member and with the inner electrode including a surface opposite said outer electrode to receive said active material and with the inner electrode sealed within the opening in the insulating member,
the insulating member including the sealed inner electrode disposed in the open end of the outer housing member and with the open end of the outer housing member deformed and exerting force against the insulating member to seal the insulating member across the open end of the outer housing member, and
an electrolyte disposed within the outer housing member and in contact with the outer housing member and the inner electrode surface and said electrolyte being a medium for transferring said active material between the inner and outer electrodes.

11. The electrolytic cell of claim 10 wherein the insulating member is relatively soft and the open end of the housing is deformed directly against the insulating member.

12. The electrolytic cell of claim 10 wherein the insulating member is relatively hard and additionally including a second relatively soft insulating member disposed between the relatively hard insulating member and the deformed open end of the outer housing.

13. An electrolytic cell structure including
an outer housing member having a closed end and an open end and a wall thereof including electrochemically active material and with the open end having an enlarged portion and with the outer housing forming an outer electrode,
a first insulating member including at least one opening extending therethrough,
at least one inner electrode extending through the opening in the first insulating member and including a surface opposite said outer electrode to receive said active material, and said inner electrode sealed within the opening in said first insulating member,
said first insulating member, including the sealed inner electrode, disposed within the enlarged portion of the outer housing member and fitting within said enlarged portion thereof,
a second ring-shaped insulating member disposed within the enlarged portion of the outer housing member against the first insulating member and the open end of the outer housing deformed against the second insulating member and with said insulating member sealing the open end of the outer housing, and
an electrolyte diposed within the outer housing in contact with the outer housing and the inner electrode, and said electrolyte being a medium for transferring sand active material between the said electrodes.

14. The electrolytic cell of claim 13 including a plurality of inner electrodes extending through and sealed to the first insulating member.

15. The electrolytic cell of claim 13 wherein the first insulating member is composed of relatively hard material and wherein the second insulating member is composed of relatively soft insulating material.

References Cited

UNITED STATES PATENTS

| | | |
|---|---|---|
| 2,736,846 | 2/1956 | Gables _____ 317—230 |
| 2,791,473 | 5/1957 | Mattox _____ 340—213 |
| 3,052,830 | 9/1962 | Ovshinsky _____ 317—231 |
| 3,119,754 | 1/1964 | Blumenfeld _____ 324—68 |
| 3,158,798 | 11/1964 | Sauder _____ 317—231 |
| 3,172,083 | 3/1965 | Constantine _____ 317—231 X |
| 3,210,662 | 10/1965 | Steinmetz et al. _____ 324—94 |
| 3,327,179 | 6/1967 | Bailey _____ 317—230 |

JAMES D. KALLAM, *Primary Examiner.*

U.S. Cl. X.R.

324—94; 340—173